United States Patent
Katsuda et al.

(10) Patent No.: US 6,884,742 B2
(45) Date of Patent: Apr. 26, 2005

(54) ALUMINUM NITRIDE CERAMICS, MEMBERS FOR USE IN A SYSTEM FOR PRODUCING SEMICONDUCTORS, CORROSION RESISTANT MEMBERS AND CONDUCTIVE MEMBERS

(75) Inventors: Yuji Katsuda, Stuttgart (DE); Jun Yoshikawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 53 days.

(21) Appl. No.: 10/306,678

(22) Filed: Nov. 26, 2002

(65) Prior Publication Data

US 2003/0153452 A1 Aug. 14, 2003

(30) Foreign Application Priority Data

Nov. 26, 2001 (JP) ...................................... P2001-358719
Oct. 23, 2002 (JP) ...................................... P2002-307811

(51) Int. Cl.[7] .................... C04B 35/582; C04B 35/5835
(52) U.S. Cl. .................... 501/98.4; 501/98.6; 501/96.4; 252/508
(58) Field of Search ............... 501/98.4, 98.5, 501/98.6, 96.4; 252/508

(56) References Cited

U.S. PATENT DOCUMENTS

| | | | | |
|---|---|---|---|---|
| 3,649,314 A | * | 3/1972 | James ........................ | 501/96.4 |
| 5,457,075 A | * | 10/1995 | Fukushima et al. ......... | 501/96.4 |
| 5,767,028 A | * | 6/1998 | Komatsu et al. ........... | 501/98.5 |
| 6,001,760 A | * | 12/1999 | Katsuda et al. ............ | 501/98.4 |
| 6,156,686 A | | 12/2000 | Katsuda et al. ............ | 501/96.1 |
| 6,486,085 B1 | * | 11/2002 | Katsuda et al. ............ | 501/98.4 |
| 2002/0110706 A1 | | 8/2002 | Katsuda et al. ............. | 428/698 |

FOREIGN PATENT DOCUMENTS

| | | | |
|---|---|---|---|
| EP | 0393524 | * | 10/1990 |
| EP | 0 780 351 A1 | | 6/1997 |
| EP | 0 798 278 A2 | | 10/1997 |
| EP | 1 0 88 801 A1 | | 4/2001 |
| EP | 1 128 425 A1 | | 8/2001 |
| JP | 62-128971 A | | 6/1987 |
| JP | 3-131574 A | | 6/1991 |
| JP | 4-332831 | * | 11/1992 |
| JP | 5-178671 | | 7/1993 |
| JP | 7-53267 A | | 2/1995 |
| JP | 09-315867 | | 12/1997 |
| JP | 10-154746 | | 6/1998 |
| JP | 10189698 | | 7/1998 |
| JP | 2001-163672 | | 6/2001 |
| JP | 2001-322874 A | | 11/2001 |

* cited by examiner

Primary Examiner—Karl Group
(74) Attorney, Agent, or Firm—Burr & Brown (57) ABSTRACT

An aluminum nitride ceramic is provided, containing boron atoms in an amount of not lower than 1.0 weight percent and carbon atoms in an amount of not lower than 0.3 weight percent and having a volume resistivity at room temperature of not higher than $1 \times 10^{12}$ Ω·cm. The aluminum ceramic comprises aluminum nitride and an intergranular phase mainly consisting of boron nitride constituting a conductive path. Such a ceramic may be obtained by holding a mixture containing at least aluminum nitride and boron carbide at a holding temperature in a range of 1400° C. to 1800° C. and then sintering the mixture at a maximum temperature that is higher than the holding temperature.

34 Claims, 6 Drawing Sheets

ALUMINUM NITRIDE CERAMICS, MEMBERS FOR USE IN A SYSTEM FOR PRODUCING SEMICONDUCTORS, CORROSION RESISTANT MEMBERS AND CONDUCTIVE MEMBERS

This application claims the benefits of Japanese Patent Applications P2001-358, 719 filed on Nov. 26, 2001 and P2002-307, 811 filed on Oct. 23, 2002, the entireties of which are incorporated by reference.

BACKGROUND OF THE INVENTION

1. Field of the Invention

The present invention relates to aluminum nitride ceramics having a low volume resistivity, a member for use in a semiconductor producing system, a corrosion resistant member and a conductive member.

2. Related Art Statement

Aluminum nitride sintered bodies have an excellent corrosion resistant property against various corrosive substances such as a halogen-based gas and have thus been utilized for various members in a system for producing semiconductors, including ceramic heaters and electrostatic chucks. A conventional dense aluminum nitride sintered body has a volume resistivity higher than $10^{13}$ Ω·cm at room temperature. It is therefore needed to reduce the volume resistivity of the aluminum nitride sintered body depending on intended applications. The applicant filed patent applications for the following aluminum nitride sintered bodies each having a volume resistivity at room temperature as low as about $10^{10}$ Ω·cm:

(1) A sintered body with a small amount of $Y_2O_3$ added (Japanese patent publication 9-315, 867A); and
(2) A sintered body with a small amount of $CeO_2$ added (Japanese patent publication 2001-163, 672A).

The above aluminum nitride sintered bodies have a high purity of aluminum nitride and a low volume resistivity at the same time, and thus may be utilized for various applications including a base material for an electrostatic chuck.

On the other hand, it has been known to reduce the resistivity of an aluminum nitride sintered body by adding a large amount (for example, not lower than 30 volume percent) of a conductive ceramic material such as silicon carbide and titanium nitride to provide a composite ceramic.

Further, in some applications, such as a base material for an electrostatic chuck, the base material is used in a wider temperature range. It is thus demanded to provide a material with a reduced dependency of the volume resistivity on temperature change. The applicant filed US-2002-0110709-A1 and disclosed an aluminum nitride sintered body having a volume resistivity at room temperature of $10^8$ to $10^{12}$ Ω·cm and a change of volume resistivity between 25 to 400° C. of the order of about 103. The sintered body may be produced by adding samarium oxide into a powdery raw material of aluminum nitride. Japanese patent publications 8-314953A and 8-350075A disclose a method for further reducing the dependency of volume resistivity on temperature of an aluminum nitride sintered body. In the disclosure, a conductive ceramics having a metallic conductivity such as TiN is added into powdery raw material of aluminum nitride in an amount of 10 to 30 weight percent.

In methods described in Japanese patent publication 9-315867A and 2001-163, 672A, it is possible to reduce the volume resistivity of aluminum nitride ceramics at room temperature to a value as low as $10^8$ to $10^9$ Ω·cm by adjusting a composition of starting material and sintering conditions. The requirements for the composition and sintering conditions are, however, strictly limited to reduce the volume resistivity at a value not higher than $10^{10}$ Ω·cm.

Further, in Japanese patent publication 5-178, 671A, boron carbide ($B_4C$) in an amount of 0.5 weight percent calculated as boron is added into aluminum nitride powder and the mixed powder is then sintered at 1800° C. for two hours. It is thus obtained a sintered body having a thermal conductivity of 153 W/m·K and a relative porosity of 98.9 percent. Boron carbide is added as a second additive for helping the sintering process of aluminum nitride powder at atmospheric pressure. The addition of boron carbide is said to have the effects of reducing the crystalline growth. A sintered body having a high thermal conductivity is thereby obtained having an improved surface roughness and reduced color defects or irregularities. The relationship between the addition of boron carbide and volume resistivity, however, is not described. According to the study of the inventors, the inventive ceramics cannot be produced according to the conditions and composition disclosed in the patent.

In Japanese patent publications 8-314953A and 8-350075A, conductive ceramics are added into an aluminum nitride raw material to provide a composite ceramic. According to this method, it is necessary to add a large amount of conductive ceramics into the aluminum nitride raw material to obtain the composite ceramic to sufficiently reduce the volume resistivity of the sintered body. Characteristic properties of aluminum nitride are, however, lost by adding a large amount of conductive ceramics. For example, a high thermal conductivity, low thermal expansion, the corrosion resistant property and the chemical stability of aluminum nitride are either lost or reduced. It is therefore desired to preserve the characteristic properties of aluminum nitride and reduce its volume resistivity.

SUMMARY OF THE INVENTION

An object of the present invention is to preserve the characteristic properties of aluminum nitride and reduce its volume resistivity. Another object of the present invention is to provide a ceramic conductive member having corrosion resistance by preserving the characteristic properties of aluminum nitride and reducing its volume resistivity. Another object of the present invention is to provide an aluminum nitride ceramic having a low volume resistivity at room temperature and a reduced temperature dependency of volume resistivity over a wide temperature range.

The present invention provides an aluminum nitride ceramic containing boron atoms in an amount of not lower than 1.0 weight percent and carbon atoms in an amount of not lower than 0.3 weight percent and having a volume resistivity at room temperature of not higher than $1 \times 10^{12}$ Ω·cm.

The present invention further provides an aluminum nitride ceramic comprising an aluminum nitride phase and an intergranular phase mainly consisting of boron nitride constituting a conductive path and having a volume resistivity at room temperature of not higher than $1 \times 10^{12}$ Ω·cm.

The present invention further provides an aluminum nitride ceramic comprising an aluminum nitride phase and an intergranular phase mainly consisting of boron nitride and having a volume resistivity at room temperature of not higher than $1 \times 10^{12}$ Ω·cm, wherein the 004 diffraction peak of the intergranular phase has a spacing d004 of not lower than 1.6650 angstrom.

The present invention further provides an aluminum nitride ceramic produced by sintering a mixture containing at least aluminum nitride and boron carbide and having a volume resistivity at room temperature of not higher than $1 \times 10^{12}$ Ω·cm.

The present invention further provides a member for use in a semiconductor producing system comprising the aluminum nitride ceramic.

The present invention further provides a corrosion resistant or a conductive member comprising the aluminum nitride ceramic.

The present invention further provides a conductive member having a volume resistivity at room temperature of not higher than $1 \times 10^6$ Ω·cm composed of an aluminum nitride ceramic containing aluminum nitride in a content of not lower than 80 weight percent.

The inventors have tried to add various additives into an aluminum nitride ceramic, and have studied the effects of the additives on the volume resistivity of the resulting aluminum nitride ceramic material. The inventors have found that the room temperature volume resistivity of an aluminum nitride sintered body may be reduced to a value not higher than $10^{12}$ Ω·cm by adding a predetermined amount of boron carbide into an aluminum nitride raw material and sintering the mixture under specified conditions. The present invention is based on the discovery.

The volume resistivity may be reduced to a value not higher than $10^{10}$ Ω·cm and further, not higher than $10^7$ Ω·cm, by further increasing the amount of boron carbide added, and/or by holding at a temperature between 1400 and 1800° C. before sintering at a maximum temperature. The inventors have reached the surprising discovery that the volume resistivity of aluminum nitride ceramics may be still further reduced to a value not higher than $10^6$ Ω·cm and even not higher than $10^2$ Ω·cm. An aluminum nitride ceramic having this level of volume resistivity is a conductive material and not a semiconductor.

Figure 1:
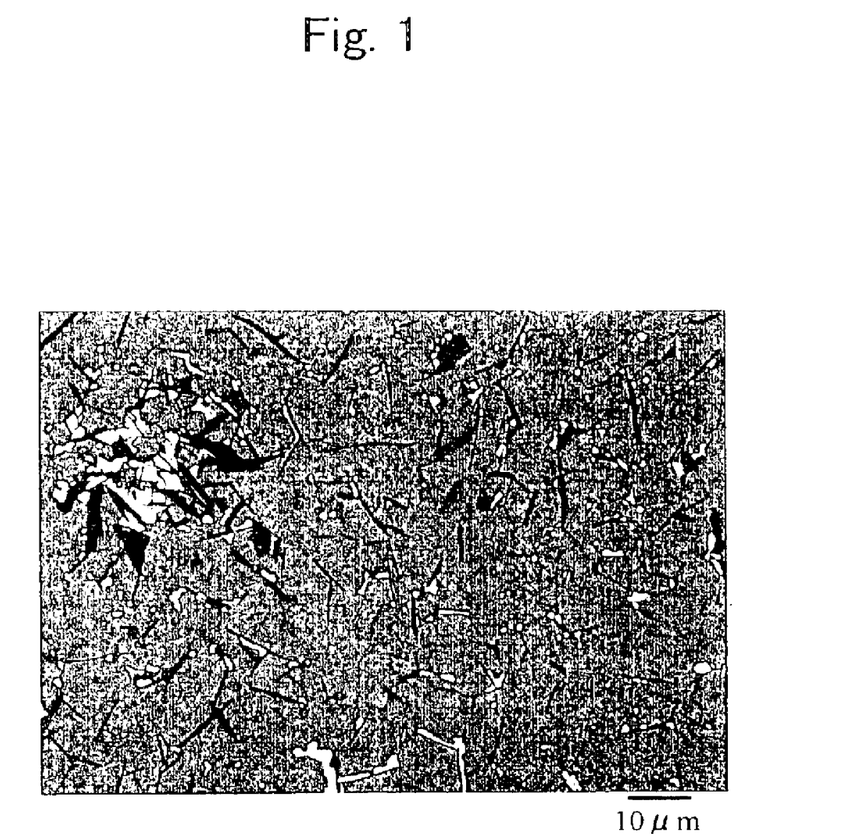
FIG. 1 is a backscattering electron image taken by a scanning electron microscope of a polished surface of a sample according to Example 1 for the analysis of microstructure.
Figure 4:
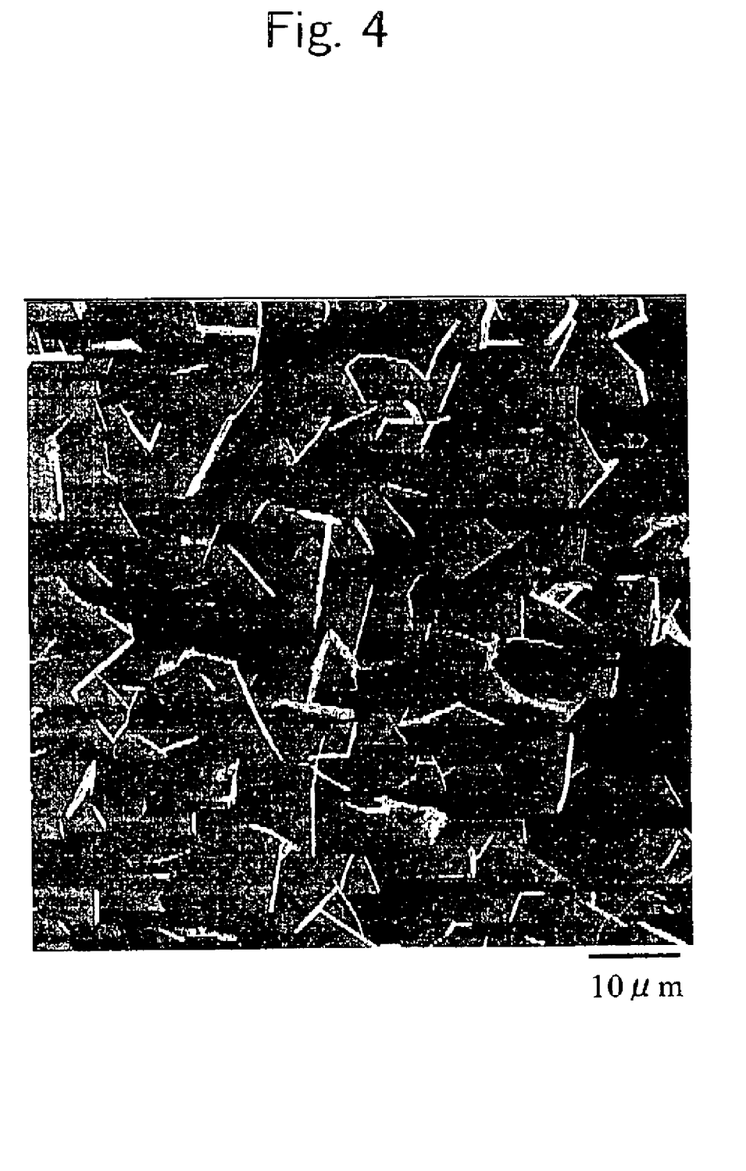
FIG. 4 shows a photograph taken by an atomic force microscope showing the current distribution analysis image of a sample according to Example 1.

The inventors have further investigated the requirements of aluminum nitride ceramics for enabling such a reduction in the volume resistivity. As described in the "Examples" section, an intergranular phase mainly consisting of boron nitride is formed between aluminum nitride grains in a ceramic having a low resistivity. The intergranular phase usually has a plate-like shape, as shown in FIG. 1. In an aluminum nitride ceramic with a reduced volume resistivity, such a plate-like intergranular phase is sufficiently grown to form a kind of continuous phase or network microstructure. As described later, the inventors have observed the current distribution of an aluminum nitride sample and found that the plate-like intergranular phase functions as a conductive path, for example, as shown in FIG. 4. It has thus been proved that the intergranular phase mainly consisting of boron nitride is continuously formed to function as a conductive path and to reduce the volume resistivity of the ceramics.

The volume resistivity of a normal boron nitride is relatively high and not lower than $10^{16}$ Ω·cm. If the boron nitride phase is continuous to form a network microstructure, however, it should be difficult to reduce the volume resistivity of an aluminum nitride ceramic.

The inventors have measured the distribution of each element in each of the aluminum nitride sintered bodies described below in the examples. As a result, it was found that the intergranular phase mainly consisting of boron nitride also contains carbon atoms.

Boron nitride has a hexagonal crystalline system like carbon (graphite). The peaks of boron nitride are near to those of graphite when measured by X-ray diffraction analysis. Carbon, however, has crystal lattice spacings that are larger than those of boron nitride. For example, a d004 spacing of the 004 diffraction peak of boron nitride is 1.6636 angstrom according to No. 34-0421. The peak position of carbon corresponding to d004 of boron nitride is d0012 of JCPDS No. 26-1076, and d0012 is 1.6740 angstrom.

On the contrary, the ceramic according to the present invention has a d004 spacing of the 004 diffraction peak of boron nitride of not lower than 1.6650 angstrom. The value is considerably larger than the d004 of normal boron nitride and smaller than the d0012 of carbon. That is, in the inventive ceramic, the intergranular phase consists of boron nitride whose crystal lattice is larger than that of normal boron nitride and smaller than that of carbon.

The expansion of the crystal lattice shows that carbon atoms are solid-soluted into crystalline lattices of boron nitride constituting the intergranular phase of the aluminum nitride ceramic. The resistivity may thus be reduced considerably. The intergranular phases with a reduced resistivity are made continuous to function as an electrically conductive path, so that the volume resistivity of the ceramic may be considerably reduced.

When boron carbide is added to the aluminum nitride raw material and the mixed powder is sintered, boron carbide reacts with gaseous nitrogen to generate boron nitride in the grain boundaries between the aluminum nitride grains during sintering. During the process, a part of the carbon atoms are solid-soluted into the boron nitride and part remains in the intergranular phase.

The inventors have further added boron nitride powder directly into the aluminum nitride raw material and sintered the mixed powder. Also, in this case, the intergranular phases mainly consisting of boron nitride are formed in grain boundaries of the aluminum nitride grains. In this case, however, carbon atoms are not solid-soluted into the intergranular phases and the expansion of spacings accompanied with the solid-soluted carbon atoms is not observed. Even when a large amount of boron nitride is added, the volume resistivity of the ceramic is higher than $10^{15}$ Ω·cm, and not reduced. The results show that the intergranular phase itself does not have electrical conductivity and does not function as a conductive path.

These and other objects, features and advantages of the invention will be appreciated upon reading the following description of the invention when taken in conjunction with the attached drawings, with the understanding that some modifications, variations and changes of the same could be made by the skilled person in the art.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

DETAILED DESCRIPTION OF THE INVENTION

An aluminum nitride ceramic according to the present invention means a ceramic material mainly consisting of a polycrystalline body composed of aluminum nitride. The process for producing the ceramic is not particularly limited, and includes a gaseous phase process such as chemical vapor deposition, physical vapor deposition, organic metal chemical vapor deposition and vapor deposition. The aluminum nitride ceramic is preferably produced by sintering.

The content of aluminum in the aluminum nitride sintered body should be sufficient to form an aluminum nitride main phase. The aluminum nitride content of the sintered body is preferably not lower than 35 weight percent, and more preferably not lower than 50 weight percent.

The aluminum nitride content is preferably not lower than 80 weight percent and more preferably not lower than 90 weight percent.

It is preferred to increase the boron atom content to a value not lower than 1.0 weight percent and the carbon atom content to a value not lower than 0.3 weight percent in the aluminum nitride ceramic. The formation of continuous intergranular phases is thereby promoted so as to further reduce the volume resistivity of the aluminum nitride ceramic. From this viewpoint, the boron atom content is preferably not lower than 2.0 weight percent, or, the carbon atom content is preferably not lower than 0.5 weight percent.

The thermal conductivity of the aluminum nitride ceramic is further increased by reducing the boron atom content to a value not higher than 5.0 weight percent. From this viewpoint, the content of boron atoms is preferably not higher than 4.0 weight percent. Alternatively, the thermal conductivity of the aluminum nitride ceramic is increased by reducing the content of carbon atoms to a value not higher than 1.5 weight percent. From this viewpoint, the content of carbon atoms is more preferably not higher than 1.0 weight percent.

In a preferred embodiment, the ratio (C/B) (by weight) of carbon atoms to boron atoms is controlled at a value not lower than 0.2 and not higher than 0.4. It is thereby possible to further reduce the volume resistivity of the aluminum nitride ceramics.

According to the present invention, the aluminum nitride ceramic, particularly a sintered body, preferably contains a rare earth element in an amount of 0.2 to 10 weight percent. It is thereby possible to obtain a dense body at a lower sintering temperature compared with ceramics with no added rare earth element. The addition of a rare earth element also has the effects of promoting the growth of the intergranular phase and improving the thermal conductivity. To further promote sintering, the content of the rare earth element is preferably not lower than 0.2 weight percent, and more preferably, not lower than 0.5 weight percent. For improving the thermal conductivity, the content of the rare earth element is preferably not higher than 10 weight percent.

The term rare earth element refers to the following seventeen elements; samarium; scandium; yttrium; lanthanum; cerium; praseodymium; neodymium; promethium; europium; gadolinium; terbium; dysprosium; holmium; erbium; thulium; ytterbium and lutetium.

In a preferred embodiment, the rare earth element is one or more elements selected from the group consisting of yttrium, lanthanum, cerium, neodymium, samarium, gadolinium, dysprosium, erbium and ytterbium.

To provide a corrosion resistant sintered body that is suitable for applications in which the contamination of impurities is to be highly controlled, such as an application for producing semiconductors, the total content of metal elements (excluding aluminum and rare earth elements) is preferably not higher than 100 ppm, in some cases. The total content is more preferably not higher than 50 ppm.

In a preferred embodiment, the open porosity of the aluminum nitride ceramic is not higher than 1 percent, and more preferably, not higher than 0.1 percent. In a preferred embodiment, the thermal conductivity of the aluminum nitride ceramic according to the present invention is not lower than 30 W/m·K. The upper limit of the thermal conductivity is not limited, however, and can be 170 W/m·K, and especially 150 W/m·K.

In a preferred embodiment, the aluminum nitride ceramic contains an intergranular phase mainly consisting of boron nitride. The following crystalline phases may be generated other than boron nitride phase. It has been proved that these secondary crystalline phases do not substantially affect the resistivity of the aluminum nitride ceramics:

(1) A complex oxide phase of a rare earth element and aluminum, such as $Y_3Al_5O_{12}$(YAG), $YAlO_3$(YAL), $Y_4Al_2O_9$(YAM);

(2) A boride of a rare earth element such as $ReB_4$ ("Re" represents a rare earth element) and $ReB_6$;

(3) A borocarbide of a rare earth element such as $ReB_2C_2$; and (4) An oxide of a rare earth element such as $Re_2O_3$.

In a preferred embodiment, the intergranular phase is formed along the outer face of the aluminum nitride particles and is plate-shaped or film-shaped. In a preferred embodiment, the intergranular phase also has an elongate shape and preferably has an aspect ratio of not lower than 5, viewed on a ground face of an aluminum nitride ceramic in a magnitude of 500 to 1000.

In a preferred embodiment, the intergranular phase forms a three-dimensional network. In this embodiment, it is not needed that the intergranular phase is continuous over the whole of the aluminum nitride ceramic. It is needed, however, that intergranular phase is continuous over a plurality of aluminum nitride grams.

The conductive path constituted by the intergranular phase may be confirmed by taking a photograph by an atomic force microscope showing the current distribution analysis image of the ceramic and by measuring the contrast of the lightness of aluminum nitride grains and that of the intergranular phase.

Preferably, the d004 spacing of the 004 diffraction peak of the intergranular phase is not lower than 1.6650 angstrom. The d004 spacing is more preferably not lower than 1.6653 angstrom, and most preferably, not lower than 1.6656 angstrom. The d004 spacing is not higher than 1.6740 angstrom (d0012 of carbon) and usually not higher than 1.6730 angstrom.

In a preferred embodiment, the aluminum nitride ceramic according to the present invention has a ratio of volume resistivity at room temperature to that at 500° C. of 0.01 to 100. The present invention successfully provides an aluminum nitride ceramic having an extremely small dependency of volume resistivity on temperature. The conductive phase of the inventive ceramic has a high electrical conductivity to give metallic properties. The ceramic according to the present invention that has such a reduced temperature dependency of its resistivity is particularly useful as a base material an electrostatic chuck, for example.

In the ceramic according to the present invention, the ratio of volume resistivity at room temperature to that at 500° C. is more preferably 0.5 to 50, and it is particularly preferred to be 0.1 to 10.

In a preferred embodiment, the aluminum nitride ceramic has aluminum nitride and a plate-like intergranular phase mainly consisting of boron nitride. The intergranular phase has a length of one side of not shorter than 5 $\mu$m. It is thereby possible to further reduce the dependency of volume resistivity on temperature. In this embodiment, the intergranular phase has a longer side, meaning that the enhancement of growth of intergranular phase. In this case, the crystallinity of the intergranular phase is further improved, so that electrons may move freely or with less bindings. Therefore, the intergranular phase has a higher electrical conductivity and behaves like a metal concerning the temperature dependency of volume resistivity. On the other hand, it is possible to increase the volume resistivity of the whole ceramic while maintaining the metallic behavior concerning the temperature dependency of volume resistivity by controlling the content and the degree of continuity of the conductive intergranular phase.

The aluminum nitride raw material may be produced by various processes, including direct nitriding, reduction nitriding and gaseous phase synthesis from an alkyl aluminum.

Boron carbide may be added to the aluminum nitride raw material. When a rare earth element is added, an oxide of a rare earth element may be added to the raw material. Alternatively, a compound of a rare earth element forming a rare earth oxide upon heating (e.g., a precursor of a rare earth oxide) may be added to the raw material. The precursor includes a nitrate, sulfate, oxalate and alkoxide, and may be added as powder. The precursor such as a nitrate or sulfate may also be dissolved into a solvent to obtain a solution, which may be added into the raw material instead. It is thereby possible to uniformly disperse the atoms of the rare earth element between aluminum nitride particles by dissolving the precursor in a solvent.

The raw material may be shaped by any known method including dry pressing, using a doctor blade method, extrusion, casting and tape forming methods.

In a formulating step, aluminum nitride raw powder may be dispersed in a solvent, into which the rare earth element may be added in the form of powder of the rare earth oxide or as a solution, as described above. In a mixing step, it is possible to simply stir the formulation. When the raw powder contains aggregates, it is possible to use a mixing and pulverizing machine, such as a pot mill trommel or attrition mill to pulverize the aggregates. When using an additive that is soluble in the solvent for pulverizing, it is enough to carry out the mixing and pulverizing step for a short (minimum) time. Further, a binder component, such as polyvinyl alcohol, may be added. In a step of removing the binder, however, it is necessary to avoid a shift or change of the formulation due to the oxidation of boron carbide.

The solvent used for the mixing step may be dried, preferably by a spray drying method. After carrying out a vacuum drying process, the particle distribution of the dried particles may preferably be adjusted by passing the particles through a mesh. In a step of forming the powdery material, the material may be pressed using a metal mold to provide a disk-shaped body. The pressure for pressing raw material is not particularly limited, as long as the formed body may be handled without causing any fracture. The pressure may preferably be not lower than 100 kgf 1 cm². The powdery material may be supplied into a die for hot pressing without particularly forming the powdery material. The sintered body according to the invention may preferably be produced by hot pressing a body to be sintered, preferably at a pressure of not lower than 50 kgf/cm². The sintering temperature is not limited, and is preferably 1700 to 2200° C., and more preferably, not lower than 1750° C. or not higher than 2100° C. The sintering temperature is most preferably 1750 to 2050° C.

In a sintering step, the temperature is preferably held at a holding temperature between 1400 to 1800° C. before sintering at the maximum temperature. By adding this temperature holding step, it has been shown that the growth of the intergranular phase mainly consisting of boron nitride in the sintered body may be further progressed to make the intergranular phase continuous and to further reduce the volume resistivity.

The preferred holding temperature in the temperature holding step may be changed depending on the amount of boron carbide added. The holding temperature is generally preferably not lower than 1450° C. and not higher than 1750° C. It is possible to control the volume resistivity and thermal conductivity values by adjusting the holding temperature. For example, the holding temperature is preferably 1550 to 1650° C. for controlling the volume resistivity at a value not higher than 100 $\Omega \cdot$cm. The holding temperature is preferably 1450 to 1550° C. for controlling the resistivity at a value between $10^5$ and $10^{12}$ $\Omega \cdot$cm. The holding temperature is preferably 1650 to 1750° C. for controlling the resistivity at a value between 100 and $10^7$ $\Omega \cdot$cm. For improving the thermal conductivity, the holding temperature may preferably be higher.

Additionally, during the temperature holding step, it is possible to change the holding temperature. For example, the raw material may be held at 1500° C. for a specified time period and then held at 1550° C. Alternatively, the temperature may be slowly elevated from 1500 to 1800° C. The time period for the temperature holding step is preferably not shorter than 2 hours, and more preferably, not shorter than 4 hours.

The aluminum nitride ceramic according to the invention may preferably be used for various members in a semiconductor producing system, such as systems for treating silicon wafers and for manufacturing liquid crystal displays. Such a semiconductor producing system means a system that can be used in a wide variety of semiconductor processes in which metal contamination of a semiconductor is to be avoided. Such a system includes film forming, etching, cleaning and testing systems.

The aluminum nitride ceramic according to the invention may be used as a corrosion resistant member. The corrosion resistant member may be used against corrosive substances such liquids including nitric acid, hydrochloric acid, mixed acid, hydrofluoric acid and aqua regia chlorine-based corrosive gases such as $Cl_2$, $BCl_3$, $ClF_3$, HCl or the like, and fluorine-based corrosive gases such as $ClF_3$ gas, $NF_3$ gas, $CF_4$ gas, $WF_6$, $SF_4$ or the like. The corrosion resistant member is particularly useful against the plasma of each gas.

The member for a semiconductor producing system is preferably a corrosion resistant member, such as a susceptor for the system. The inventive ceramic may be preferred for a metal embedded article having a corrosion resistant member and a metal member embedded therein. The corrosion resistant member includes a susceptor for mounting a semiconductor wafer thereon, a dummy wafer, a shadow ring, a tube for generating high frequency plasma, a dome for generating high frequency plasma, a high frequency wave-permeable window, an infrared radiation-permeable window, a lift pin for supporting a semiconductor wafer, a shower plate, an electrostatic chuck and a vacuum chuck. A resistive heating element, electrostatic chuck electrode or an electrode for generating high frequency plasma may be embedded in the susceptor.

The aluminum nitride ceramic according to the present invention may be used as a conductive material having a volume resistivity at room temperature of not higher than $10^6$ $\Omega \cdot$cm. Heretofore, a conductive ceramic material having an excellent corrosion resistant property and thermal conductivity as described above has not been known. The present invention thus provides a novel conductive ceramic having a high corrosion resistant property. The volume resistivity may more preferably be reduced to a value not higher than 100 $\Omega \cdot$cm.

Such a conductive member may be used as, for example, a counter electrode for generating high frequency for use in a semiconductor producing system. The conductive member may also be used as an electrode or heat generator to be exposed against a halogen-based gas or various chemical substances.

EXAMPLES (1) Production of Mixed Powder of AlN/B$_4$C/Y$_2$O$_3$:

A commercial AlN powder produced by reduction nitriding (oxygen content of 0.97 weight percent) was used. A commercial B$_4$C powder having a high purity and a mean particle diameter of 1.5 µm was used. A commercial powder of Y$_2$O$_3$ with a purity of not lower than 99.9 percent and a mean particle diameter of not larger than 1 µm was used.

Each powder was weighed as shown in Tables 1 to 5. The amounts of B$_4$C and Y$_2$O$_3$ were converted to weight parts provided that the amount of aluminum nitride was converted to 100 weight parts. Each weighed powder was then subjected to wet blending using isopropyl alcohol as a solvent, a nylon pot and nylon media for 4 hours to obtain a slurry. After the blending, the slurry was collected and dried at 110° C. in nitrogen atmosphere to obtain a powdery raw material. The amounts of AlN, B$_4$C and Y$_2$O$_3$ in the formulation were calculated as "weight parts" ignoring the contents of impurities in each powder.

(2) Forming and Sintering Steps:

Each mixed powder obtained in section (1) was then formed into a disk body by uniaxial pressing at a pressure of 200 kgf/cm$^2$. The disk-formed body had a diameter of about 50 mm and a thickness of about 20 mm, and was then contained in a mold made of graphite for sintering.

Each formed body was sintered by hot pressing at a pressure of 200 kgf/cm$^2$. In the sintering step, the temperature was raised at a speed of 300 to 1000° C./hour and then held at each holding temperature shown in Tables 1 and 3 for 20 hours. The temperature was then raised to a maximum temperature of 1800 to 2000° C., held for 4 hours, and then cooled. In the cooling step, the temperature was lowered to 1400° C. at a speed of 300° C./hour and then cooled in a furnace. During the sintering, the formed body was set in vacuum from room temperature to 1000° C. and nitrogen gas was then introduced at a pressure of 1.5 MPa at 1000° C. The pressure was held at 0.15 MPa until the temperature reached 1400° C. in the cooling step while nitrogen gas was introduced at a flow rate of 5 liter 1 minute.

(3) Evaluation:

The thus obtained sintered bodies were subjected to the following evaluation:

The density and open porosity were measured by Archimedes' method using water as a medium.

Volume resistivity was measured by a method according to "JIS C 2141" at room temperature under air, in samples having a volume resistivity of not lower than $10^6$ $\Omega \cdot$cm. The test sample has the following parts: a circular plate with a diameter φ of 50 mm and thickness of 1 mm; a main electrode with a diameter of 20 mm; a guard electrode with an inner diameter of 30 mm and outer diameter of 40 mm; and an applying electrode with a diameter of 45 mm. The electrodes are formed of silver. 100 V/mm of voltage was applied and a current was read one minute after the application of voltage so that the volume resistivity is calculated.

The resistivity was measured by a four probe method in a sample having the resistivity of lower than $10^6$ $\Omega \cdot$cm.

The volume resistivities at 100, 300 and 500° C. were also measured.

The four-point bending strength at room temperature was measured according to "JIS R1601."

The thermal conductivity was measured by a laser flash method and calculated. The specific heat value (753 kJ/kg·K) of aluminum nitride was applied for the calculation.

The B and Y contents were determined by inductively coupled plasma (ICP) spectrometry.

The oxygen and nitrogen contents were determined by an inert gas melting infared absorptiometry analysis method.

The carbon content was determined by a high frequency heating infared absorptiometry analysis method.

The crystalline phase was determined by using a rotating anode type X-ray diffraction system "RINT" supplied by "Rigaku Denki" under the following condition: CuK α, 50 kV, 300 mA, and 2 θ=20 to 70° C.

The polished surface of a sample was observed by a backscattering electron image to observe the microstructure. It was also analyzed by EPMA and an atomic force microscope (AFM).

TABLE 1

| example | B₄C amount added parts by weight | Y₂O₃ amount added parts by weight | sintering temperature °C. | holding temperature (°C.) | open porosity % | apparent density g/cm³ | bulk density g/cm³ | volume resistivity room temperature | 100° C. | 300° C. | 500° C. |
|---|---|---|---|---|---|---|---|---|---|---|---|
| 1 | 3.4 | 2 | 2000 | 1600 | 0.02 | 3.19 | 3.18 | 1.9 | — | — | — |
| 2 | 5.7 | 2 | 2000 | 1600 | 0.04 | 3.13 | 3.13 | 1 | — | — | — |
| 3 | 3.4 | 0 | 2000 | 1600 | 0.04 | 3.17 | 3.17 | 3E + 06 | 3E + 06 | 9E + 05 | 5E + 05 |
| 4 | 2.3 | 2 | 2000 | 1600 | 0.04 | 3.22 | 3.22 | 19 | — | — | — |
| 5 | 3.4 | 5 | 2000 | 1600 | 0.01 | 3.19 | 3.19 | 8.7 | — | — | — |
| 6 | 3.4 | 0.5 | 2000 | 1600 | 0.01 | 3.16 | 3.16 | 830000 | 7E + 05 | 2E + 05 | 1E + 05 |
| 7 | 3.4 | 2 | 2000 | 1700 | 0.02 | 3.18 | 3.17 | 2E + 06 | 2E + 06 | 1E + 06 | 6E + 05 |
| 8 | 3.4 | 5 | 2000 | 1700 | 0.01 | 3.17 | 3.17 | 5800 | — | — | — |
| 9 | 4.6 | 2 | 2000 | 1600 | 0.03 | 3.16 | 3.16 | 1.5 | — | — | – |

TABLE 2

| example | bending strength MPa | thermal conductivity W/mK | chemical analysis B wt % | N wt % | O wt % | C wt % | Y wt % | C/B weight ratio | identified intergranular phase |
|---|---|---|---|---|---|---|---|---|---|
| 1 | 279 | 56 | 2.40 | 33.62 | 1.05 | 0.74 | 1.29 | 0.31 | BN, YAL |
| 2 | 268 | 33 | 3.90 | 33.61 | 1.15 | 1.14 | 1.40 | 0.29 | BN, YAM |
| 3 | 401 | 55 | — | — | — | — | — | — | BN, B₄C |
| 4 | 298 | 67 | 1.68 | 33.40 | 0.95 | 0.55 | 1.09 | 0.33 | BN, YAL |
| 5 | 282 | 80 | — | — | — | — | — | — | BN, YAM |
| 6 | 389 | 61 | — | — | — | — | — | — | BN, YAL |
| 7 | 351 | 104 | — | — | — | — | — | — | BN, YAL |
| 8 | 317 | 135 | — | — | — | — | — | — | BN, YAM |
| 9 | 227 | 52 | — | — | — | — | — | — | BN, YAL |

TABLE 3

| example | B₄C amount added parts by weight | Y₂O₃ amount added parts by weight | sintering temperature °C. | holding temperature (°C.) | open porosity % | apparent density g/cm³ | bulk density g/cm³ | volume resistivity room temperature | 100° C. | 300° C. | 500° C. |
|---|---|---|---|---|---|---|---|---|---|---|---|
| 10 | 5.7 | 0 | 2000 | 1500 | 0.05 | 3.13 | 3.13 | 4E + 06 | 2E + 06 | 2E + 05 | 7E + 04 |
| 11 | 5.7 | 2 | 2000 | 1500 | 0.01 | 3.14 | 3.14 | 6E + 08 | — | — | — |
| 12 | 5.7 | 5 | 2000 | 1500 | 0.02 | 3.17 | 3.17 | 2E + 08 | 1E + 08 | 3E + 07 | 7E + 06 |
| 13 | 5.7 | 0 | 2000 | 1600 | 0.01 | 3.11 | 3.11 | 78 | — | — | — |
| 14 | 5.7 | 5 | 2000 | 1600 | 0.01 | 3.15 | 3.15 | 0.86 | — | — | — |
| 15 | 5.7 | 2 | 2000 | 1700 | 0.00 | 3.12 | 3.12 | 8300 | — | — | — |
| 16 | 5.7 | 5 | 2000 | 1700 | 0.00 | 3.12 | 3.12 | 21 | — | — | — |
| 17 | 5.7 | 2 | 1900 | 1500 | 0.00 | 3.12 | 3.12 | 2E + 11 | 3E + 10 | 6E + 08 | 4E + 07 |
| 18 | B₄C: 1.1 C: 0.5 | 2 | 2000 | 1600 | 0.00 | 3.24 | 3.24 | 9E + 05 | 9E + 05 | 9E + 05 | 1E + 06 |
| 19 | 1.5 | 5 | 1900 | 1600 | 0.00 | 3.25 | 3.25 | 6E + 07 | 7E + 07 | 9E + 07 | 6E + 07 |

TABLE 4

| example | bending strength Mpa | thermal conductivity W/mK | chemical analysis B wt % | N wt % | O wt % | C wt % | Y wt % | C/B weight ratio | identified intergranular phase |
|---|---|---|---|---|---|---|---|---|---|
| 10 | 448 | 41 | 4.08 | 32.51 | 0.82 | 1.26 | 0.00 | 0.31 | BN, B₄C |
| 11 | 325 | 43 | 3.79 | 32.78 | 1.20 | 1.14 | 1.00 | 0.30 | BN, YB₄ |
| 12 | 342 | 43 | 3.86 | 32.17 | 1.49 | 1.13 | 3.07 | 0.29 | BN, YB₄, YAL, YB₂C₂ |
| 13 | 336 | 43 | — | — | — | — | — | — | BN, B₄C |
| 14 | 263 | 53 | — | — | — | — | — | — | BN, YAM |
| 15 | 346 | 63 | — | — | — | — | — | — | BN, YAM |
| 16 | 300 | 116 | — | — | — | — | — | — | BN, YAM, Y₂O₃ |
| 17 | 464 | 36 | — | — | — | — | — | — | BN, YB₄ |

TABLE 4-continued

| example | bending strength Mpa | thermal conductivity W/mK | chemical analysis | | | | | C/B weight ratio | identified intergranular phase |
|---|---|---|---|---|---|---|---|---|---|
| | | | B wt % | N wt % | O wt % | C wt % | Y wt % | | |
| 18 | 337 | 93 | — | — | — | — | — | — | BN, YAL |
| 19 | 359 | 125 | — | — | — | — | — | — | BN, YAM |

EXAMPLE 1

The powdery raw material had a composition of 100/3.½.0 (AlN/B$_4$C/Y$_2$O$_3$; in weight parts). The raw material was formed and sintered. In the sintering step, the temperature was raised at a speed of 1000° C./hour, held at 1600° C. for 20 hours and held at 2000° C. for 4 hours to obtain a dense body. The pressure during the sintering step was held at 0.15 MPa. The sintered body was processed for the evaluation of properties shown in the Tables.

The sintered body had a bulk density of 3.19 g/cm$^3$ and an open porosity of not higher than 0.1 percent, which indicates that the body was sufficiently densified. The resistivity at room temperature measured by four probe method was 1.9 Ω·cm and is a surprisingly low value. The four point bending strength was 279 MPa and the thermal conductivity was 56 W/m·K, both values being high.

It was proven that the sintered body has, in addition to AlN phase, a YAlO$_3$ (YAL) phase and a phase mainly consisting of BN. In this sample, although B$_4$C is added into the raw material, the diffraction peak corresponding to B$_4$C was not observed.

Figure 6:
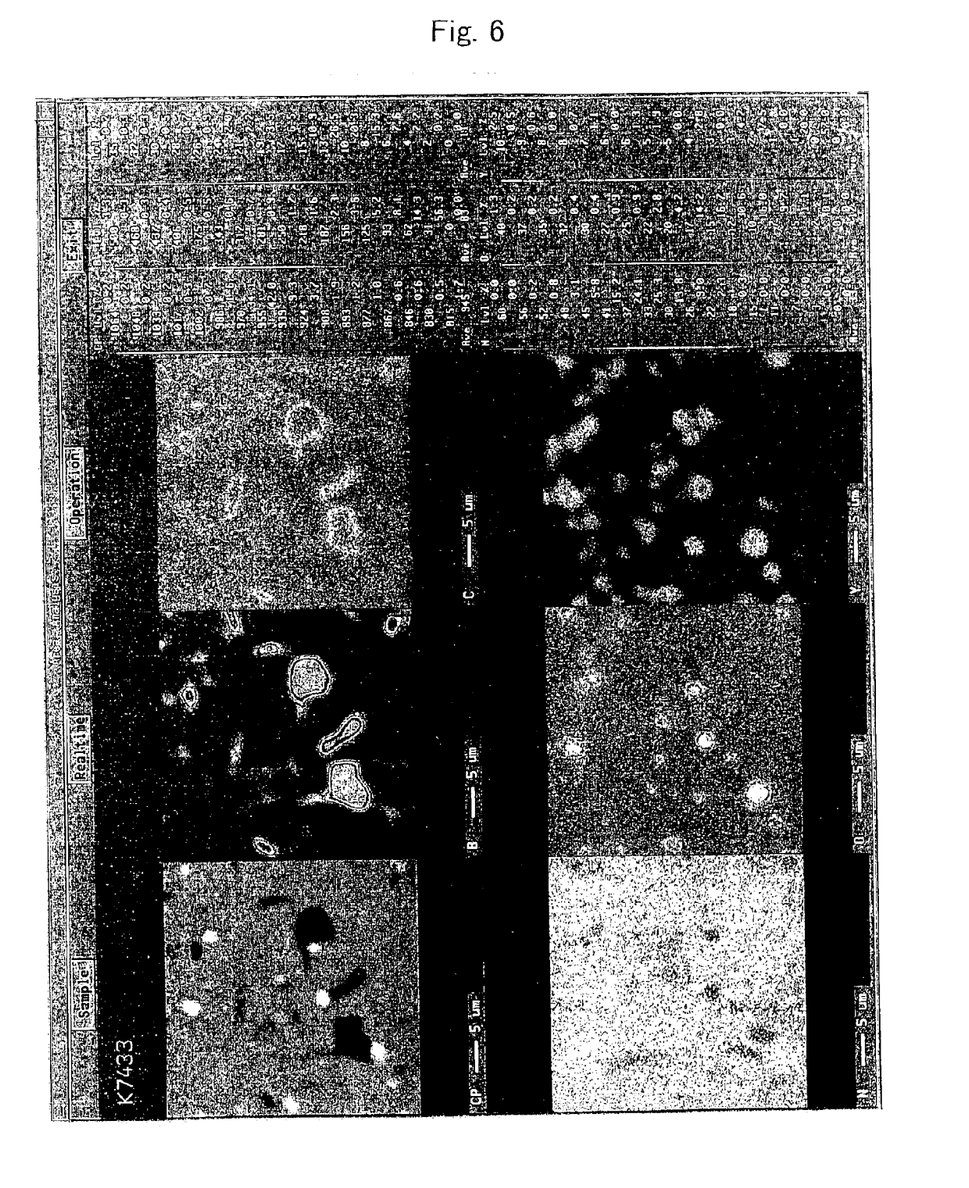
FIG. 6 is a photograph of element distribution analysis of a sample according to Example 1 by EPMA.

The distribution of the plate-like phase was identical with that of B atoms according to the mapping by means of EPMA (FIG. 6). It was thus proven that the plate-like phase mainly consists of BN. It has also proven that the plate-like phase further contains carbon atoms.

EXAMPLE 2

The powdery raw material had a composition of 100/5.7/2.0 (AlN/B$_4$C/Y$_2$O$_3$; in weight parts). The raw material was shaped and sintered under the same conditions as the Example 1. The properties of the sintered body were evaluated.

The sintered body had a bulk density of 3.13 g/cm$^3$ and an open porosity of not higher than 0.1 percent, which indicates that the body was sufficiently densified. The resistivity at room temperature measured by four probe method was 1 Ω·cm and is a surprisingly low value. The four point bending strength was 268 MPa and thermal conductivity was 33 W/m·K. It was proven that the sintered body had, in addition to AlN phase, a Y$_4$Al$_2$O$_9$ (YAM) phase and a phase mainly consisting of BN by X-ray diffraction analysis.

EXAMPLES 3 TO 17

In Example 3, the same conditions as the Example 1 are applied except that yttria is not added. As a result, the volume resistivity is 3×10$^6$ Ω·cm. In the Example 1, the volume resistivity was extremely reduced to 1.9 Ω·cm by the addition of yttria. The addition of yttria thus proved to be effective for further reducing the volume resistivity. Moreover, although a B$_4$C phase was not identified in Example 1 with the addition of yttria, B$_4$C phase is identified in Example 3 without the addition of yttria. These results are consistent with the theory that the addition of yttria may assist in the conversion of B$_4$C to BN in the sintered body.

In Example 4, substantially same results as the Example 1 were obtained. Since the amount of the B$_4$C added was slightly lower (2.3 weight percent) in Example 4, the volume resistivity is slightly higher than that in the Example 1.

In each of Examples 5 to 9, the amounts of B$_4$C, yttria and holding times were variously changed. The experimental results are substantially in conformity with those in the Examples 1 to 4.

In Examples 10 to 17, the amount of B$_4$C was set at 5.7 weight percent and the amount of yttria, the maximum temperature in the sintering step and the holding temperature were variously changed. These results are also in conformity with the above results. It was also proven that the volume resistivity may be further reduced by increasing the amount of B$_4$C added to the raw material.

Further, as can be seen from the above results, the holding temperature in the temperature holding step is preferably 1450 to 1750° C. and the maximum temperature is preferably not lower than 1800° C. The holding temperature is preferably 1550 to 1650° C. for reducing the volume resistivity to a value not higher than 100 Ω·cm. The holding temperature is preferably 1450 to 1550° C. for reducing the volume resistivity at a value between 10$^5$ to 10$^{12}$ Ω·cm. The holding temperature is preferably 1650 to 1750° C. for reducing the volume resistivity of 100 to 10$^7$ Ω·cm. It is possible to control the growth of the intergranular phases mainly consisting of BN by controlling the holding temperature. In particular, a holding temperature of 1550 to 1650° C. may be effective for the growth of the plate-like and a continuous intergranular phase and for enhancing the solid solution of carbon atoms into the intergranular phase. It is thus preferred for obtaining a ceramic having a lower volume resistivity.

The preferred ranges of the resistivity and the holding temperature are some of examples. The preferred holding temperature range for the corresponding resistivity range may be varied depending on an amount of added B$_4$C. Moreover in the Example 3, the ratio of the volume resistivity at room temperature to that at 500° C. is about 10 times. In the Examples 6 and 7, the ratio of the volume resistivity at room temperature to that at 500° C. is lower than 10 times. In the Examples 10 and 12, the ratio of the volume resistivity at room temperature to that at 500° C. is about 60 or 30 times. A sintered body having a low volume resistivity at room temperature, as well as a smaller difference between the volume resistivities at room temperature and 500° C., was thus obtained.

EXAMPLE 18

In Example 18, a commercial carbon powder having a high purity was added as well as $B_4C$ and $Y_2O_3$. The powdery raw material had a composition of 100/1.1/2.0/0.5 ($AlN/B_4C/Y_2O_3/C$; in weight parts). In the sintering step, the shaped body was held at 1600° C. for 20 hours and then held at 2000° C. for 4 hours. The other conditions are the same as Example 1.

In the sintered body according to Example 18, a small amount of added carbon may be contained in the conductive phase and functions substantially same as $B_4C$. The sintered body had a considerably low volume resistivity at room temperature. Further, the volume resistivity at 500° C. was substantially the same as that at room temperature. The surprising results may be attributed to the following. In Example 18, a relatively small amount of $B_4C$ is added. The amount of liquid phase generated in the sintering step is relatively large compared with the amount of $B_4C$ so that B, C and O atoms may be easily diffused to enhance the growth of the conductive phase mainly consisting of boron nitride.

EXAMPLE 19

In Example 19, the powdery raw material had a composition of 100/1.5/5.0 ($AlN/B_4C/Y_2O_3$; in weight parts). In the sintering step, the temperature was held at 1600° C. for 20 hours and then held at 1900° C. for 4 hours. The other conditions are the same as the Example 1.

The sintered body according to the Example 19 had a considerably low volume resistivity at room temperature. Further, the volume resistivity at 500° C. was substantially the same as that at room temperature. The surprising results may be attributed to the following. In Example 19, a relatively small amount of $B_4C$ is added. The amount of liquid phase generated in the sintering step is relatively large compared with the amount of $B_4C$ so that B, C and O atoms may be easily diffused to enhance the growth of the conductive phase mainly consisting of boron nitride.

COMPARATIVE EXAMPLE 1

A Commercial BN powder having a high purity was used instead of $B_4C$ and the sintered body was evaluated. The powdery raw material had a composition of 100/32.9/2.0 ($AlN/BN/Y_2O_3$; in weight parts). The temperature was raised at a speed of 1000° C./hour. The formed body was held at 1600° C. for 20 hours and then held at 2000° C. for 4 hours to produce a dense body. The pressure was held at 0.15 MPa in the sintering step.

A sufficiently dense body having a volume resistivity at room temperature of as high as $1 \times 10^{15}$ Ω·cm was obtained. BN and $YAlO_3$ phases were identified in addition to an AlN phase by X-ray diffraction measurement.

COMPARATIVE EXAMPLE 2

A dense body was produced under the conditions same as those in Comparative Example 1 except that the powdery raw material had a composition of 10018.512.0 (AlN/BN/$Y_2O_3$; in weight parts). The volume resistivity at room temperature and the identified phases are the same as those in Comparative Example 1.

TABLE 5

| comparative example | BN amount added parts by weight | $Y_2O_3$ amount added parts by weight | sintering temperature °C. | holding temperature °C. | Open porosity % | Apparent density g/cm³ | bulk density g/cm³ | volume resistivity Ω·cm at room temperature |
|---|---|---|---|---|---|---|---|---|
| 1 | 32.9 | 2 | 2000 | 1600 | 0.02 | 2.93 | 2.93 | 1E + 15 |
| 2 | 8.5 | 2 | 2000 | 1600 | 0.02 | 3.16 | 3.16 | 1E + 15 |

| comparative example | bending strength MPa | Thermal conductivity W/mK | B wt % | N wt % | O wt % | C wt % | Y wt % | weight ratio C/B | identified intergranular phase |
|---|---|---|---|---|---|---|---|---|---|
| 1 | 332 | 64 | 10.56 | 38.88 | 1.22 | 0.04 | 1.55 | 0.00 | BN YAL |
| 2 | 382 | 113 | 3.35 | 35.19 | 1.22 | 0.04 | 1.55 | 0.01 | BN YAL |

Comparison of the Microstructure of Samples According to Examples 1, 2 and Comparative Example 1

Figure 2:
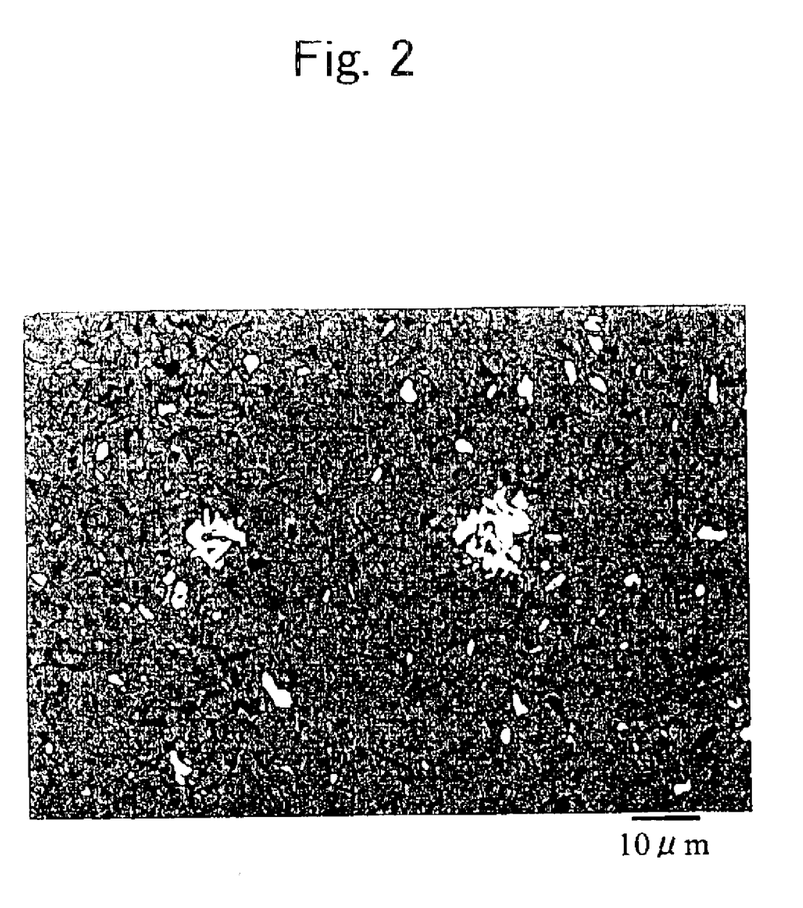
FIG. 2 is a backscattering electron image taken by a scanning electron microscope of a polished surface of a sample according to Example 2 for the analysis of microstructure.
Figure 3:
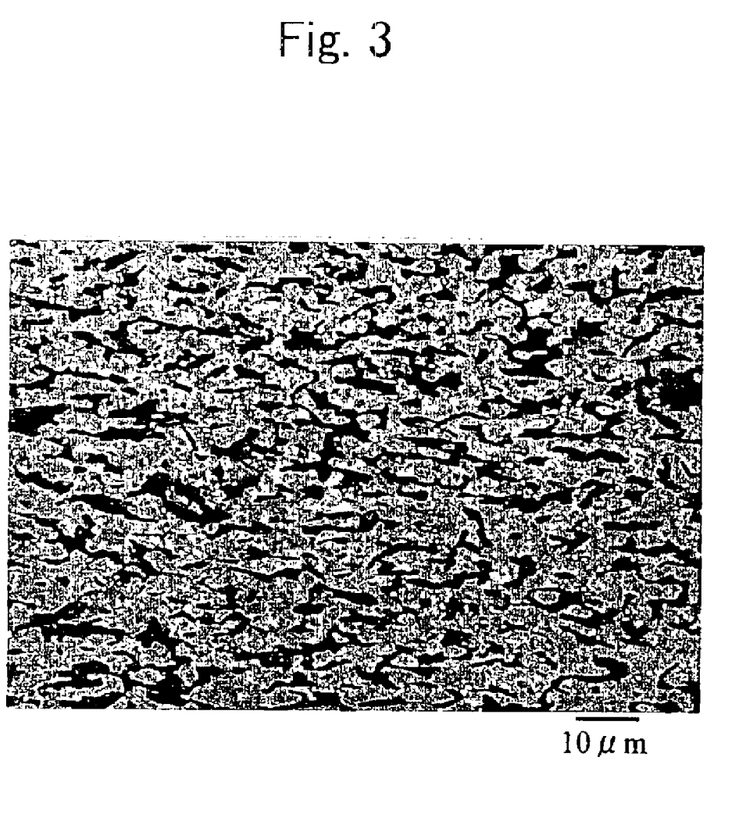
FIG. 3 is a backscattering electron image taken by a scanning electron microscope of a polished surface of a sample according to Comparative Example 1 for the analysis of microstructure.

FIGS. 1, 2 and 3 are photographs showing backscattering electron images of polished surfaces of samples according to Examples 1, 2 and Comparative Example 1 for microstructure analysis. In FIGS. 1, 2 and 3, each photograph may be roughly divided into three regions in terms of brightness: white, gray and black regions.

The white region corresponds to an intergranular phase containing Y atoms and having a dimension of submicrons to several microns. The gray region consists of an AlN phase constituting the matrix of each sintered body. The black region is a plate-like intergranular phase that proved to mainly consisting of BN according to the results of X-ray diffraction analysis and element analysis by EPMA. In the sample according to Example 1, this blackish intergranular phase is grown so that each adjacent plate-like intergranular phase is interconnected to form a network. In the sample according to Example 2, with a larger amount of $B_4C$ added, the AlN particles (gray region) are smaller than those in the sample according to Example 1 and the blackish intergranular phase mainly consisting of BN is interconnected to form a network microstructure. In the sample according to the Comparative Example 1, the content of BN is very large and the BN phase is interconnected at many points. However, the growth and formation of the plate-like pattern is not clearly observed.

Mechanism for the Reduced Resistivity in the Sample According to Example 1:

The relationship between the microstructure (especially the intergranular phase) and the resistivity of the sample according to Examples 1, 2 or Comparative Example 1 was further investigated as follows. The sample according to Example 1, having a reduced resistivity, was analyzed by means of an atomic force microscope (AFM) to obtain a current distribution analytic image, which is shown in FIG. 4. The analysis was carried out using a model "SPM stage D 3100" (probe type "DDESP") supplied by Digital Instruments. The test sample had the shape of a plate. The surface of the sample was polished for current distribution analysis. A DC bias was applied on the back face of the sample. The measurement of the current distribution on the surface was performed on contact AFM current measurement mode.

Figure 5:
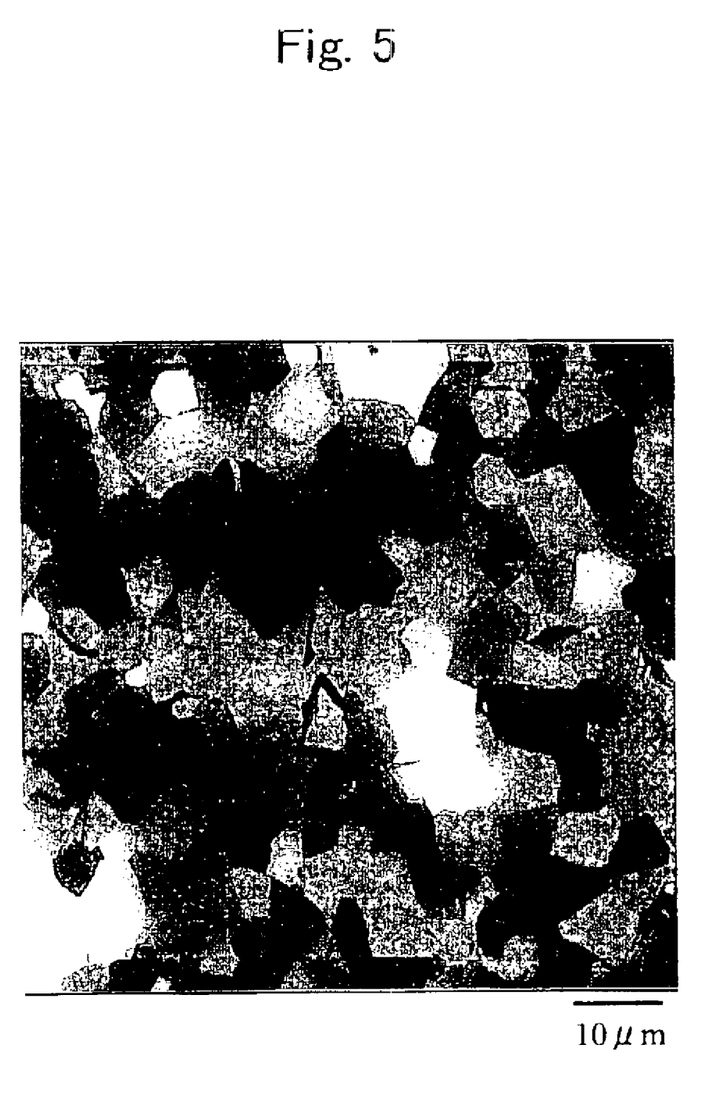
FIG. 5 shows a photograph taken by an atomic force microscope showing the surface roughness of a sample according to Example 1 over the same visual field as FIG. 4.

FIG. 5 is an image showing the surface roughness over the same visual field as that of FIG. 4. The shape of each grain may be observed in this image. In FIG. 4, the current is larger in a white and bright region, indicating that the conductivity is high. As can be seen from the figures, the conductive phase (white and bright region) is elongated to have a plate-like shape. The distribution and shape of the conductive phase (shown in FIG. 4) proved to be identical with the distribution of the plate-like intergranular phase shown in FIG. 5. It is also confirmed that the distribution of the conductive phase (blackish region) is identical with the distribution of the intergranular phase mainly consisting of BN shown in FIG. 1.

Therefore, the intergranular phase mainly consisting of BN has a low resistivity and three-dimensionally interconnected to form a conductive path or network which reduces the resistivity of the sample. In Comparative Example 1 shown in FIG. 3, although the intergranular phase mainly consisting of BN is continuous, the intergranular phase had a higher resistivity (contrary to Example 1) which prevents the reduction of the resistivity of the sample.

Analysis of the intergranular phase mainly consisting of BN:

FIG. 6 shows the results of analyzing the distribution of elements by EPMA for the sample according to Example 1. B, C and N atoms were detected in the plate-like intergranular phase mainly consisting of BN. Although BN of hexagonal crystalline system usually has a high resistivity, it was proven that the intergranular phase mainly consisting of BN further contains a C component. The C component is solid-soluted into the BN phase to reduce the resistivity of the BN which otherwise has a higher resistivity.

The positions of diffraction peaks were investigated by X-ray diffraction measurement for further analysis of the intergranular phase mainly consisting of BN. The 004 peak (JCPDS No. 34-0421: 2 θ=55.164°) without overlapping the other peaks, was applied as a peak corresponding with BN. $Al_2O_3$ having known lattice constants was added as an internal standard. The deviation of the 116 peak (2 θ=57.497°) was used to adjust the 2 θ position of the 004 peak of BN. 2 θ was measured by a peak top method to calculate the d004 spacing value of the 004 diffraction peak. As a result, in the sample according to Example 1, the d004 spacing proved to be 1.6683 angstrom, which is considerably larger that that of BN (JCPDS No. 34-0421: 2 θ=55.164°; d004 is 1.6636 angstrom). That is, the lattice of the intergranular phase mainly consisting BN in the sample according to Example 1 was expanded compared with the lattice of normal BN.

C (graphite) has the basic crystalline structure that is the same as that of hexagonal BN. The diffraction pattern and the peak positions of graphite by X-ray diffraction measurement are also very similar to those of hexagonal BN. The d004 spacing of BN corresponds with d0012 of C (JCPDS No. 26-1076: 2 θ=54.793°; d0012 is 1.6740 angstrom). That is, the above peak of C corresponding with the d004 spacing of BN has a slightly larger spacing. The spacing of the sample according to Example 1 was compared with those of BN and C and shown in Table 6.

The spacing of the sample according to Example 1 was proved to be between those of BN and graphite. The results all consistent with the theory that C component is solid-soluted into BN to expand the crystal lattices of BN. The C components solid-soluted into BN phase may provide a high conductivity to BN phase to reduce the volume resistivity of the sample.

The sample according to Example 7 had the same composition as that in Example 1, except that the holding temperature during the temperature holding step was 1700° C. and higher than that in Example 1. The volume resistivity at room temperature was $2 \times 10^6$ Ω·cm in Example 7. The d004 spacing of the phase mainly consisting of BN was 1.6659 angstrom in Example 7. The d004 spacing of the sample according to Example 2 with BN added was 1.6649 angstrom.

TABLE 6

| sample | JCPDS card number | spacing (angstrom) | volume resistivity (Ω · cm) |
|---|---|---|---|
| BN | No. 34-0421 | 1.6636 | |
| comparative example 2 | — | 1.6649 | $1 \times 10^{15}$ |
| example 7 | — | 1.6659 | $2 \times 10^6$ |
| example 1 | — | 1.6683 | 2 |
| C | No. 26-1076 | 1.6740 | |

As can be seen from the results, the resistivity of the sample is increased as the d004 spacing of the intergranular phase approached that of BN, and reduced as the d004 spacing approached that of graphite. That is, the shift of the spacing was clearly correlates with the volume resistivity. In this way, the resistivity is regulated by the content of C component solid-soluted into BN phase.

As described above, the present invention may preserve the characteristics properties of an aluminum nitride and reduce its volume resistivity. The present invention has been explained referring to the preferred embodiments. However, the present invention is not limited to the illustrated embodiments which are given by way of examples only, and may be carried out in various modes without departing from the scope of the invention.

What is claimed is:

1. An aluminum nitride ceramic containing boron atoms in an amount of not lower 1.0 weight percent and carbon atoms in an amount of not lower than 0.3 weight percent and having a volume resistivity at room temperature that is not higher than $1 \times 10^{12}$ Ω·cm, said aluminum nitride ceramic further comprising an intergranular phase mainly consisting of boron nitride;

wherein said aluminum nitride ceramic is produced by holding a mixture containing at least aluminum nitride and boron carbide at a holding temperature in a range of 1400° C. to 1800° C. and then sintering said mixture at a maximum temperature that is higher than said holding temperature.

2. The aluminum nitride ceramic of claim 1, wherein said intergranular phase constitutes a conductive path.

3. The aluminum nitride ceramic of claim 1, wherein said intergranular phase is plate-shaped.

4. The aluminum nitride ceramic of claim 1, wherein carbon in solid-soluted into said intergranular phase.

5. The aluminum nitride ceramic of claim 1, wherein a ratio (C/B) of carbon atoms C to boron atoms B by weight is in a range of 0.2 to 0.4.

6. The aluminum nitride ceramic of claim 1, further comprising a rare earth element in an amount of at least 0.2 weight percent.

7. The aluminum nitride ceramic of claim 1, wherein said aluminum nitride ceramic has a thermal conductivity that is not lower than 30 W/m·k.

8. The aluminum nitride ceramic of claim 1, wherein said ceramic aluminum nitride has an open porosity that is not larger than 0.1 percent.

9. The aluminum nitride ceramic of claim 1, wherein a ratio of said volume resistivity at room temperature to a volume resistivity at 500° C. is in a range of 0.01 to 100.

10. A member for use in a system for producing semiconductors comprising the aluminum nitride ceramic of claim 1.

11. A corrosion resistant member comprising the aluminum nitride ceramic of claim 1.

12. A conductive member comprising the aluminum nitride ceramic of claim 1.

13. An aluminum nitride ceramic comprising aluminum nitride and an intergranular phase mainly consisting of boron nitride and constituting a conductive path, wherein carbon is solid-soluted into said intergranular phase, said aluminum nitride ceramic having a volume resistivity at room temperature of not higher than $1 \times 10^{12}$ Ω·cm;
  wherein said aluminum nitride ceramic is produced by holding a mixture containing at least aluminum nitride and boron carbide at a holding temperature in a range of 1400° C. to 1800° C. and then sintering said mixture at a maximum temperature that is higher than said holding temperature.

14. The aluminum nitride ceramic of claim 13, wherein said intergranular phase is plate-shaped.

15. The aluminum nitride ceramic of claim 13, wherein a ratio (C/B) of carbon atoms C to boron atoms B by weight is in a range of 0.2 to 04.

16. The aluminum nitride ceramic of claim 13, further comprising a rare earth element in an amount of at least 0.2 weight percent.

17. The aluminum nitride ceramic of claim 13, wherein said aluminum nitride ceramic has a thermal conductivity of at least 30 W/m·k.

18. The aluminum nitride ceramic of claim 13, wherein a ratio of said volume resistivity at room temperature to a volume resistivity at 500° C. is in a range of 0.01 to 100.

19. A member for use in a system for producing semiconductors comprising the aluminum nitride ceramic of claim 13.

20. A corrosion resistant member comprising the aluminium nitride ceramic of claim 13.

21. A conductive member comprising the aluminum nitride ceramic of claim 13.

22. An aluminum nitride ceramic comprising aluminum nitride and an intergranular phase mainly consisting of boron nitride, said aluminum nitride ceramic having a volume resistivity at room temperature of not higher than $1 \times 10^{12}$ Ω·cm;
  wherein a 004 diffraction peak of said intergranular phase has a d004 spacing not lower than 1.6650 angstrom;
  wherein said aluminum nitride ceramic is produced by holding a mixture containing at least aluminum nitride and boron carbide at a holding temperature in a range of 1400° to 1800° and then sintering said mixture at a maximum temperature that is higher than said holding temperature; and
  wherein a ratio (C/B) of carbon atoms C to boron atoms B by weight in said aluminum nitride ceramic is in a range of 0.2 to 0.4.

23. The aluminum nitride ceramic of claim 22, wherein said intergranular phase is plate-shaped.

24. The aluminum nitride ceramic of claim 22, wherein said intergranular phase is continuously formed.

25. The aluminum nitride ceramic of claim 22, wherein carbon is solid-soluted into said intergranular phase.

26. The aluminum nitride ceramic of claim 22, further comprising a rare earth element in an amount of at least 0.2 weight percent.

27. The aluminum nitride ceramic of claim 22, wherein said aluminum nitride ceramic has a thermal conductivity of at least 30 W/m·k.

28. The aluminum nitride ceramic of claim 22, wherein said aluminum nitride ceramic has an open porosity that is not larger than 0.1 percent.

29. A conductive member having a volume resistivity at room temperature of not higher than $1 \times 10^6$ Ω·cm comprising an aluminum nitride ceramic containing aluminum nitride in an amount of at least 80 weight percent;
  wherein said aluminum nitride ceramic has an intergranular phase mainly consisting of boron nitride and constitutes a conductive path;
  wherein said aluminum nitride ceramic is produced by holding a mixture containing at least aluminum nitride and boron carbide at a holding temperature in a range of 1400° C. to 1800° C. and then sintering said mixture at a maximum temperature that is higher than said holding temperature; and
  wherein said aluminum nitride ceramic contains boron atoms in an amount of not lower than 1.0 weight percent and carbon atoms in an amount of not lower than 0.3 weight percent.

30. The conductive member of claim 29, wherein said conductive member has a volume resistivity at room temperature of not higher than 100 Ω·cm.

31. The conductive member of claim 29, wherein a 004 diffraction peak of said intergranular phase has a d004 spacing of at least 1.6650 angstrom.

32. The conductive member of claim 29, wherein said intergranular phase is continuously formed.

33. The conductive member of claim 29, wherein said aluminum nitride ceramic further comprises a rare earth element in an amount of at least 0.2 weight percent.

34. An aluminum nitride ceramic comprising aluminum nitride and an intergranular phase mainly consisting of boron nitride, said aluminum nitride ceramic having a volume resistivity at room temperature of not higher than $1 \times 10^{12}$ Ω·cm;
  wherein a 004 diffraction peak of said intergranular phase has a d004 spacing not lower than 1.6650 angstrom;
  wherein said aluminum nitride ceramic is produced by holding a mixture containing at least aluminum nitride and boron carbide at a holding temperature in a range of 1400° C. to 1800° C. and then sintering said mixture at a maximum temperature that is higher than said holding temperature; and
  wherein carbon is solid-soluted into said intergranular phase.

* * * * *

UNITED STATES PATENT AND TRADEMARK OFFICE
CERTIFICATE OF CORRECTION

PATENT NO. : 6,884,742 B2
DATED : April 26, 2002
INVENTOR(S) : Yuji Katsuda and Jun Yoshikawa It is certified that error appears in the above-identified patent and that said Letters Patent is hereby corrected as shown below:

Title page,
Item [56], References Cited, U.S. PATENT DOCUMENTS,
please change "2002/0110706 A1" to -- 2002/0110709 A1 --

Column 18,
Line 45, please add -- than -- after "lower"
Line 62, please change "in" to -- is --

Column 19,
Line 60, please add -- C -- after "1400°" and after "1800°"

Signed and Sealed this

Twelfth Day of July, 2005

JON W. DUDAS
*Director of the United States Patent and Trademark Office*

UNITED STATES PATENT AND TRADEMARK OFFICE
CERTIFICATE OF CORRECTION

PATENT NO. : 6,884,742 B2
DATED : April 26, 2005
INVENTOR(S) : Yuji Katsuda and Jun Yoshikawa It is certified that error appears in the above-identified patent and that said Letters Patent is hereby corrected as shown below:

<u>Title page,</u>
Item [56], References Cited, U.S. PATENT DOCUMENTS,
please change "2002/0110706 A1" to -- 2002/0110709 A1 --.

<u>Column 18,</u>
Line 45, please add -- than -- after "lower".
Line 62, please change "in" to -- is --.

<u>Column 19,</u>
Line 60, please add -- C -- after "1400°" and after "1800°".

This certificate supersedes Certificate of Correction issued July 12, 2005.

Signed and Sealed this

Eighteenth Day of October, 2005

JON W. DUDAS
*Director of the United States Patent and Trademark Office*